Patented June 29, 1943

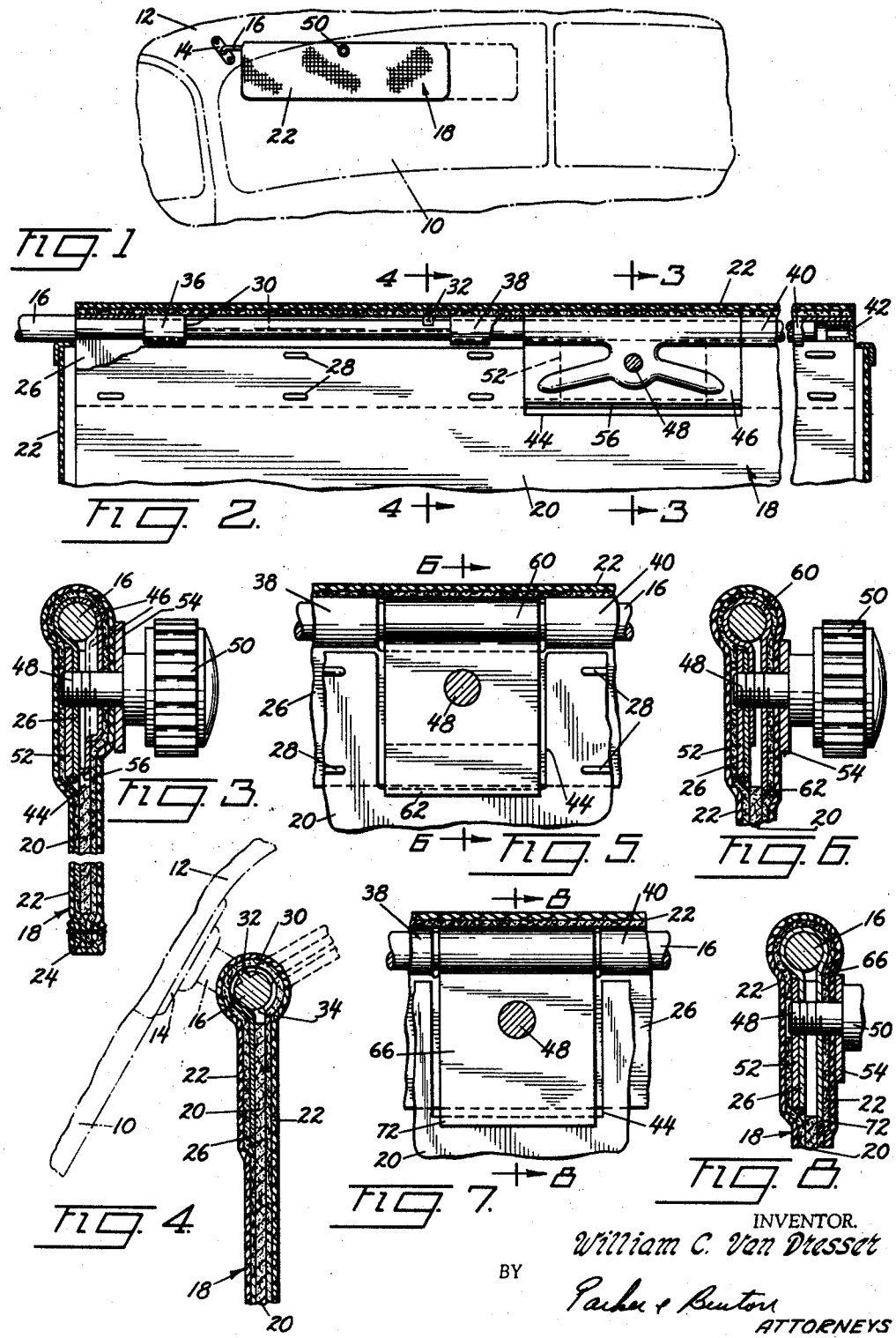

2,322,898

UNITED STATES PATENT OFFICE 2,322,898

VISOR STRUCTURE

William C. Van Dresser, Detroit, Mich.

Application January 22, 1942, Serial No. 427,705

6 Claims. (Cl. 296—97)

This invention relates to improvements in visor structures such as are used in closed automobile bodies to prevent light rays passing through the windshield at such an angle as to blind an occupant of the vehicle.

The improvement relates particularly to visors or sun shields which are so supported within the body as to be capable of rotatable adjustment about a supporting rod or adjustment longitudinally along the rod.

An object is to provide an improved simple construction having means manually operable to grip the rod to maintain the visor panel at adjusted positions rotatably thereabout or lengthwise therealong.

Another object is to provide a visor assembly construction of such a character that the visor panel may be readily inserted upon or withdrawn from its supporting rod when such rod is detached from the body but withdrawal of the panel from the rod is not possible so long as the rod is secured at its proper place to the body wall.

The above objects and others together with various important features will more fully appear from the following description, appended claims, and accompanying drawing, wherein:

Figure 1 is an interior elevation within a motor vehicle body showing a visor embodying my invention in position over the windshield, Fig. 2 is a fragmentary vertical sectional view lengthwise through the visor structure shown in Fig. 1, Fig. 3 is a vertical cross-sectional view taken on line 3—3 of Fig. 2, Fig. 4 is a vertical sectional transverse view taken on line 4—4 of Fig. 2, Fig. 5 is a fragmentary sectional view taken on the same line as Fig. 2 but showing a slightly modified form of construction, Fig. 6 is a vertical sectional view taken on line 6—6 of Fig. 5, Fig. 7 is a vertical sectional view taken on a line similar to that of Fig. 5 but showing a slightly modified form of construction, and Fig. 8 is a vertical sectional view taken on line 8—8 of Fig. 7.

In the view of Fig. 1 the windshield is indicated as 10 and the body wall thereabove as 12. A bracket 14 is suitably secured to the body wall and itself carries a supporting rod 16 upon which the visor panel 18 is mounted for rotatable adjustment and for longitudinal adjustment as indicated by the dotted outline. The visor panel itself may be fabricated of any suitable type of material. One common form of visor panel is to provide a foundation indicated as 20 in the sectional views of Figs. 3, 6, 7 and 8 and a two ply layer of covering material 22 extended thereover. This may be cloth over wadding or any other suitable sheet material. In Fig. 3 the panel is shown as reinforced with a marginal binding 24 along its lower edge.

In Fig. 2 one side of the panel is illustrated with the covering material stripped away and there is secured to the top margin of the foundation panel itself a frame element 26. This frame element is formed of a strip of metal and as shown is attached by staples 28 to the foundation panel 20 as shown particularly in Figs. 2, 4, 5 and 7. Covering material 22 extends over this frame element.

The frame element is shaped along one linear margin to provide a split tube and this split tube is cut away as at 30 in Fig. 2 linearly and circumferentially (Fig. 4) where the cut out is indicated also as 30. Within this opening is disposed a detent 32 formed on the rod 16. It is apparent that the panel would have lengthwise movement upon the rod as limited by the detent engaging the opposite ends of the opening 30 within the tube as shown in Fig. 2. This detent 32 also shown in Fig. 4 is of a size to pass through the split 34 (Fig. 4) in the tube but obviously cannot pass therethrough until aligned therewith. This point is more fully discussed hereinafter. At each end of the opening 30 the split tube has a bearing about the rod. One end bearing is indicated as 36 and an intermediate bearing as 38. The tube then has another bearing 40 at the opposite end of the rod, which bearing 40 is adapted to receive a plug 42 to close the end of the tube.

The foundation panel is itself cut away as at 44 (Figs. 2, 5 and 7) along its margin and opposite the rod. The frame structure 26 extends across one side of this cut out opening as shown in Figs. 2, 5 and 7. The tubular portion of the frame strip is also partially cut away at this opening and is shown in Fig. 3 so that the tubular portion engages and embraces only approximately half of the circumference of the rod 16. In Figs. 2 and 3 there is mounted in this opening 44 a rod engaging plate indicated as 46.

This plate, it will be understood, is within the opening underneath the covering material 22 and is also shaped to partially embrace the rod so as to grip the same. It is apertured to receive through the plate the shank 48 of a manually adjustable thumb screw element 50. The end of the shank is threaded into the plate 52 which abuts the frame strip 26. The shank passes through such frame strip 26. There is a washer 54 mounted on the shank on the opposite side of the panel and adapted upon tightening of the thumb screw 50 to exert a pressure against the plate 46. It will be noted that this plate has a flange at its lower edge 56 which bears against the frame strip 26 so that when the thumb nut is tightened the plate 46 is bent and urged toward the rod 16 to snugly grip the same to retain the panel at any position to which it may be adjusted on the rod.

The adjustment may be so arranged that the panel can be rotated upon the rod and will frictionally hold itself at its rotated position without adjustment of the thumb nut but for longitudinal adjustment this nut must be released and the panel moved lengthwise and the thumb nut then tightened in place to hold the panel at this new lengthwise position.

The construction of Figs. 5 and 6 is very similar to that heretofore described except for details of the particular member which engages the rod 16 and is tightened by operation of the thumb nut. In Figs. 5 and 6 this member is in the form of a U-shaped clip indicated as 60. This clip is shown in elevation in Fig. 5. It is disposed within the opening 44 except that one side wall overlaps such opening as shown at 62. Its marginal portions are brought into superimposed relationship as shown in Fig. 6 and apertured to pass the shank 48 of the thumb nut 50 disposed as heretofore described.

The end of this shank is threaded into a plate 52 also as heretofore described which rests against the frame strip 26 as described in connection with the structure of Fig. 3. There is a washer 54 positioned also as described in connection with the construction of Fig. 3 and upon tightening of the thumb nut pressure is exerted to urge the marginal portions of the clip 60 toward each other so as to tighten the clip about the rod in a manner well understood to hold the panel at the position to which it may be adjusted upon the rod.

The construction shown in Figs. 7 and 8 is similar to that of Figs. 5 and 6 except that in this instance the clip is formed from the frame member itself. In other words that portion of the frame opposite the opening 44 is extended as at 66 in Figs. 7 and 8 forming a lip that overlaps as at 72 the foundation sheet 20 and superposes the opening 44 therein and is apertured to receive the shank 48 of the thumb nut 40 which shank is threaded into the plate 52 as heretofore described. This lip 66 is urged and tightened about the rod and the same is true of clip 60 heretofore described which was so tightened thereabout and for the same purpose.

It is apparent that each one of these slightly different modifications would accomplish the same result of permitting the panel to be adjusted upon the rod and tightening the same thereupon at the position to which it is adjusted.

It will be noted that the split 34 in the tubular element that extends along the margin of the foundation panel is disposed spaced away from the top margin of the foundation panel 20 and that it is of sufficient width so that the detent 32 on the rod could be moved therethrough to install the panel upon the rod or to withdraw the panel therefrom. It is apparent, however, that when the rod is secured by the bracket 18 to its position upon the body wall that the angular disposition of the windshield 10 limits the arc of swing of the panel and that its permitted arc of swing is not such that the detent 32 will register with the split 34. For this reason it is not possible to withdraw the panel from the rod when the panel is in place. However, upon removing the rod from the body and loosening the thumb nut the panel may be readily withdrawn from the rod by rotating the panel to the point where the split 34 registers with the detent 32 and a new panel may be substituted upon the supporting rod. This is of considerable convenience in assembling and disassembling or replacing such structures.

It is to be understood that the journals 36, 38 and 40 of the split tube have a relatively free fit upon the rod. That is, they don't bind thereon to restrain the movement. They merely support the panel upon the rod for rotation and the panel is held at adjusted positions by the frictional gripping of the elements actuated by the thumb nut so that when this is released the panel can be readily withdrawn from the rod or placed thereon.

What I claim:

1. Visor mechanism comprising, in combination, a supporting rod, a visor panel having a frame secured to one side of the panel and extending along one margin, said frame having a part embracing the rod supporting the panel thereupon for adjustment rotatably thereabout and longitudinally therealong, said panel having a marginal opening adjacent to the rod opposite the frame, a part shaped to grip the rod disposed within said opening, an adjustment screw coupling said part with the frame and manually operable to actuate the part relative to the frame to grip the rod to releasably secure the visor panel thereto at adjusted positions.

2. Visor mechanism comprising, in combination, a supporting rod, a visor panel having a frame secured to one side of the panel and extending along one margin, said frame having a part embracing the rod supporting the panel thereupon for adjustment rotatably thereabout and longitudinally therealong, said panel having a marginal opening adjacent to the rod opposite the frame, the frame having a rod gripping part folded about the rod within said opening and a manually adjustable screw connecting the free end of the said part with the frame for actuation of said end toward the frame urging the part to grip the rod to maintain the panel at adjusted positions upon the rod.

3. Visor mechanism comprising, in combination, a supporting rod, a visor panel having a frame secured to one side of the panel and extending along one margin, said frame having a part embracing the rod supporting the panel thereupon for adjustment rotatably thereabout and longitudinally therealong, said panel having a marginal opening adjacent to the rod and opposite the frame, a rod gripping element disposed within the opening and folded about the rod, a manually rotatable screw extending between the two ends of the element within the opening and threaded into the frame for adjustment of the screw to tighten the element about the rod to maintain the panel at adjusted positions upon the rod.

4. Visor mechanism comprising, in combination, a supporting rod, a visor panel having a frame secured to one side of the panel and extending along one margin, said frame having a part embracing the rod supporting the panel thereupon for adjustment rotatably thereabout and longitudinally therealong, said panel being cut away along one margin opposite an intermediate portion of the frame, said frame having a part adjacent to said opening shaped to partially embrace the rod, a cooperating clamping part disposed within said opening and having a portion shaped to partially embrace the rod, a screw member connecting said clamping part to the frame and manually operable to tighten the clamping part against the rod in cooperation with that portion of the frame shaped to grip the rod to maintain the panel at different positions of adjustment relative to the rod.

5. Visor mechanism for an automobile body having a windshield and a body wall superposing the windshield comprising, in combination with the windshield and said body wall, a supporting rod secured at one end to said body wall adjacent the windshield, a visor panel having a split tubular element secured along one margin thereof and embracing the rod supporting the panel thereupon for rotation thereabout through an arc determined by the windshield and the body wall thereabove, said tubular element having one side wall at the split secured to the panel and having the edge of the opposite side wall at the split terminating spaced above the margin of the panel with the split directly superposing said margin, said tubular element having an opening extending from said edge of the side wall longitudinally of the tube and circumferentially to a point spaced from the edge of the other side wall, said rod having a detent projecting when the panel is swung to any position permitted by said windshield and superposed body wall portion radially into said opening and being of a size to pass lengthwise through the split in the tube.

6. Visor mechanism for an automobile body having a windshield and a body wall superposing the windshield comprising, in combination with the windshield and said body wall, a supporting rod secured at one end to said body wall, a visor panel having a split tubular element secured along one margin thereof and embracing the rod supporting the panel thereupon for rotation thereabout through an arc determined by the windshield and the body wall, said tubular element having one side wall of the split secured to the panel, said rod having a detent projecting radially therefrom of a size to pass lengthwise through the split in the tubular element, said detent projecting from the rod at such an angle as not to come into alignment with the split in the tubular element within the permitted arc of swing of the panel upon the rod as limited by the windshield and the body wall thereabout.

WILLIAM C. VAN DRESSER.